United States Patent Office 3,140,566
Patented July 14, 1964

3,140,566
ADHESIVE COMPOSITIONS
Herman B. Wagner, Blooming Glen, Pa., assignor to Tile Council of America, Inc., New York, N.Y., a corporation of New York
No Drawing. Filed Aug. 9, 1960, Ser. No. 48,359
16 Claims. (Cl. 50—536)

The present invention relates to epoxy resin adhesive compositions which are compatible with water. More particularly the present invention relates to epoxy resin compositions which produce a hard, cured resin in the presence of water.

Prior to the present invention, workers skilled in the epoxy resin adhesive composition art were steadfast in requiring that water be eliminated from both the components of the epoxy resin compositions and the surfaces to which it was to be applied. This was so because heretofore epoxy resin adhesives containing water did not cure hard and integrally strong. Moreover, the epoxy resin adhesive compositions heretofore known did not form a satisfactory bond when applied to wet surfaces or to surfaces which had a film of water on them.

Another disadvantage of the epoxy resin adhesive compositions heretofore known resides in the difficulty of removing these compositions from surfaces to which they have been applied. When such compositions are used to set tile, for example, costly and often noxious organic solvents had to be used to remove the adhesive composition from the tile surfaces.

It is an object of the present invention to provide epoxy resin adhesive compositions which cure in the presence of water.

It is a further object of the present invention to provide epoxy resin adhesive compositions which may be emulsified in and readily removed by water.

A further object of the present invention is to provide epoxy resin adhesive compositions which are compatible with water, so that water may be added as a diluent to adjust the viscosity of the adhesive composition, thereby improving the workability of the composition.

A still further object of the present invention is to provide a method for setting tile with epoxy resin adhesive compositions without the need for either protecting the surface of the tile from contact with the adhesive composition, or for using costly and noxious organic solvents to remove the adhesive compositions from the tile surface.

Other objects of the invention will be clear from the following description.

The epoxy resin adhesive compositions of the present invention comprise epoxide resin polymers or monomers, and poly-amido-amine epoxide hardeners.

The poly-amido-amine epoxide hardeners are produced by copolymerization of polyamines with polycarboxylic acids, the copolymerization reaction being permitted to proceed to such an extent that the products produced are soluble in both epoxy resin and water.

In conducting the copolymerization reaction, it is important that excess polyamine be used, so that unreacted polyamine is present in the resulting copolymer. In the case where no unreacted amine remains, water solubility is lost and the products do not possess the required ability to harden an epoxide polymer. Nor are such reaction products soluble in the epoxy resin and water.

As has been noted hereinabove, suitable amine hardeners are prepared by reacting the polyamines and polycarboxylic acids described herein at temperatures below the decomposition temperature of the polyamines by employing the appropriate polyamine in stoichiometric excess of that theoretically required to react with the appropriate polycarboxylic acid. The temperature of the reaction is preferably between about 100 and 200° C. Especially good results are achieved when the temperature is between about 120 and 160° C.

In accordance with the present invention, aliphatic polyamines containing two or more amino nitrogens may be used to produce the amine hardeners. Polyamines containing primary nitrogens are especially suitable.

Polyamines suitable for making the poly-amido-amine compounds of the present invention have the formulae:

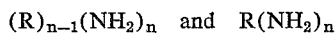

$(R)_{n-1}(NH_2)_n$ and $R(NH_2)_n$ where R is a hydrocarbon radical and $n$ is an integer having a value of at least 2, and preferably between about 4 and 10. Such polyamines should have a formula weight of at least 60 and preferably between about 90 and 500.

Examples of polyamines that may be used include ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines satisfying the above formulae, such as alkyl polyamines in which the alkyl group is butyl, hexyl, octyl and so forth. The hydrocarbon radical $R_1$ attached to the amino nitrogen atoms may have up to 50 carbon atoms or more. Preferably, however, the hydrocarbon radical has fewer than about 30 carbon atoms.

Especially suitable are polyamines which have a value of $n$ of at least 4, or polyamines wherein the formula weight of R is greater than about 90. It has been found that where polyamines are used in which $n$ is an integer less than 4, or R is of a molecular weight lower than 90, satisfactory hardening action is not obtained. This is believed to be due in part to the reaction of such low molecular weight polyamines with polycarboxylic acids to form compounds having a high melting point, which compounds require high reaction temperatures, e.g., above the decomposition temperature of the polyamines, to effect the fusion which precedes the amidation reaction. The same problems are experienced when, for example, a polycarboxylic acid, e.g., $R(COOH)_2$, is employed wherein R is of low molecular weight. A further difficulty found to exist when low molecular weight polyamines and polycarboxylic acids are used is that the reaction products produced are insoluble in epoxide polymers and therefore are not able to function as hardeners.

The polycarboxylic acids suitable for reaction with the above described polyamines to produce the poly-amido-amine epoxide hardeners of the present invention have at least two carboxyl groups and may be represented by the formula $R(COOH)_n$, where R is a hydrocarbon radical which may be saturated or unsaturated, aliphatic, cycloaliphatic, or heterocyclic, and $n$ is an integer having a value of at least 2. Among the preferred polycarboxylic acids are the straight chained saturated dicarboxylic acids such as adipic, pimelic, suberic, azelaic, sebacic, nonone dicarboxylic acid, and the higher members of this series, including mixtures thereof. Also may be mentioned the straight chained unsaturated dicarboxylic acids, including citraconic acid, mesaconic acid and itaconic acid. Especially suitable for use are the so-called resin acids. These may be classified as diterpene acids, a major constituent being abietic acid. When such diterpene acids are dimerized, a dicarboxylic acid results. Particularly useful are those diterpene acids which, upon being dimerized, have a formula weight of about 300 to 900, and preferably between about 500 to 600.

The poly-amido-amine epoxide hardeners of the present invention are produced by dissolving the polycarboxylic acid and polyamine in a suitable organic solvent, in which the polyamine and the polycarboxylic acid are soluble. The amount of the polyamine is in excess of that stoichiometrically required to react with the polycarboxylic acid. The amount of excess polyamine is preferably at least about 5 percent, and may be between about 5 and 100 percent, or higher, based on the polycarboxylic acid. The solvent employed is not critical, since after mixing the solvent is preferably removed, for example by evaporation. The residue remaining after solvent evaporation is then heated to a temperature of between about 100 to 200° C., care being taken that the temperature employed is below the decomposition temperature of the polyamine used. The time of heating should be at least about one-half hour, or between about 1 and 25 hours, and is preferably between about 1 and 16 hours. Although the solvent is preferably removed prior to heating, it should be understood that the solvent may also be removed after heating.

The resinous epoxides suitable for use in the present invention comprise those compounds having at least two epoxy groups, i.e., at least two

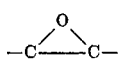

groups. The polyepoxides may be saturated or unsaturated, aliphatic, cycloaliphatic, or heterocyclic and may be substituted if desired with substituents such as chlorine atoms, hydroxyl groups, ether radicals, and the like. They may also be monomeric or polymeric.

Examples of the polyepoxides include, among others, epoxidized glycerol dioleate, 1,4-bis(2,3-epoxypropoxy) benzene, 1,3-bis(2,3-epoxypropoxy) benzene, 4,4'-bis(2,3-epoxypropoxy) diphenyl ether, 1,8-bis(2,3-epoxypropoxy)-octane, 1,4 - bis(2,3 - epoxypropoxy)-cyclohexane, 4,4' - bis(2-hydroxy-3,4'-epoxybutoxy)-diphenyldimethylmethane, 1,3-bis(4,5 - epoxypentoxy) - 5 - chlorobenzene, 1,4-bis(3,4-epoxybutoxy)-2-chlorocyclohexane, 1,3-bis(2-hydroxy-3,4-epoxybutoxy) benzene, 1,4-bis and (2-hydroxy-4,5-epoxypentoxy) benzene.

Among the preferred epoxides are the epoxy polyethers of polyhydric phenols obtained by reacting a polyhydric phenol with a halogen containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bis-phenol A), 2,2-bis(4-hydroxyphenyl) butane, 4,4'-dihydroxybenzophenone, bis (b-hydroxyphenyl) ethane, 2,2 - bis(4 - hydroxyphenyl) pentane, and 1,5-dihydroxynaphthalene. The halogen-containing epoxides may be further exemplified by 3-chloro-1,2-epoxybutane, 3-bromo - 1,2 - epoxyhexane, 3-chloro-1,2-epoxyoctane, and the like.

The monomer products produced by this method from dihydric phenols and epichlorohydrin may be represented by the general formula:

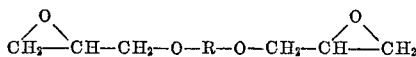

wherein R represents a divalent hydrocarbon radical of the dihydric phenol. The polymeric products will generally not be a single simple molecule but will be a complex mixture of glycidyl polyethers of the general formula:

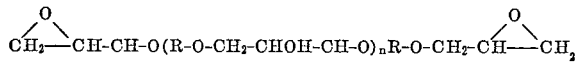

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxides resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation), "Gen Epoxy" (General Mills), "DER Resins" (Ciba), "ERL Resins" (Bakelite Corporation), "Epi-Rez" (John Dabney); the peracetic acid-epoxidized compounds sold under the trademark "Unox Diepoxides" (Union Carbide Chemical Company); and the trifunctional epoxy compounds sold under the trademark "Epiphen" (The Borden Company). An example of the trifunctional type of compounds is "Epiphen" ER–823, which has the following formula:

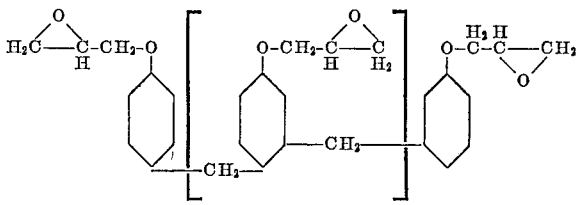

To produce the adhesive compositions, the poly-amido-amine hardening agent produced as described hereinabove is mixed with either a liquid or solid epoxide resin. The amount of the hardened amine derivative mixed with the epoxy resin is capable of some variation. In general, it will vary from about 5 to 200 percent by weight of the epoxide resin, and is preferably from about 50 to 100 percent by weight of the epoxide resin.

When liquid epoxide resin compositions are used, the adhesive compositions may be produced by simply dissolving the hardener in the liquid epoxide resin. When the epoxide resin is solid, the epoxide resin may be dissolved in a suitable solvent prior to the addition of the hardening agents. Suitable solvents which dissolve the epoxide resins include phenyl glycidyl ether, acetone, methyl ethyl ketone, isophorone ethyl acetate, butyl acetate, ether alcohols such as methyl, ethyl or butyl ether of ethylene glycol, and so forth.

Specific examples embodying the teachings set forth above are here given by way of exemplification and not restriction.

*Example I*

The prime poly-amido-amine hardener was prepared by dissolving 14.6 parts by weight of adipic acid in 100 parts by weight of ethyl alcohol and to this mixture were added 40.0 weights parts of N-octadecene trimethylene diamine. After solution was effected, the resulting mixture was heated to evaporate the alcohol, then placed for 16 hours in an oven held at 120° C. Upon cooling an orange-brown paste was obtained. This was slowly soluble in an equal weight of water yielding a gelatinous solution.

The epoxide polymer used was of the epichlorohydrin-bisphenol of acetone type, having a viscosity of about 13,000 centipoises (25° C.), an epoxide equivalent of approximately 200, and a melting point in the range of 8 to 12° C. The epoxide polymer was a complex mixture of glycidyl polyether and had the following general formula:

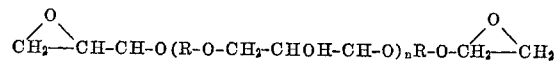

The orange-brown paste produced was added to an equal weight of the liquid epoxide polymer described hereinabove. An adhesive composition which hardened on standing was obtained.

The adhesive composition was effectively and readily hardened in the presence of water, and was capable of being readily removed from surfaces upon application of a water-soaked cloth.

*Example II*

An adhesive composition was prepared by dissolving N-octadecene trimethylene diamine in an equal weight of the liquid epoxy resin polymer described in Example I. The resulting composition did not readily or effectively harden in the presence of water and aqueous alkali and acid solutions. Nor was it removable from a surface by application of a water-soaked cloth.

*Example III*

Following the procedure of Example I, stoichiometric amounts of dimerized tall oil resin were reacted with the following amines by heating at 155° C. for 1 hour:

Ethylene diamine
Diethylene triamine
Tetraethylene pentamine
N-alkyl ($C_{14-18}$) trimethylene diamine The products of these reactions were added to an equal weight of the liquid epoxide resin described in Example I. The resulting adhesive compositions did not effectively harden, and did not exhibit the water-cleanability characteristic of the adhesive compositions of Example I.

*Example IV*

Example III was repeated, except that in preparing the amine hardener, the amines were added to the dimerized tall oil resins in an amount which was 100 percent in excess of that stoichiometrically required to react with the dimerized tall oil.

When added to the liquid epoxide resin of Example I, water-cleanable compositions were obtained which readily and effectively hardened.

*Example V*

The procedure of Example I was followed, but with substitution of an epoxide resin of the epichlorohydrin-bisphenol of acetone type having an epoxide equivalent of about 185 and a viscosity of approximately 7,000 centipoises (25° C.). The resulting composition was more fluid than that obtained in Example I, and again showed the same water-cleanability characteristic, and good hardening characteristics of the composition produced in Example I.

*Example VI*

The procedure of Example I was followed but with substitution of a solid epoxide polymer of the epichlorohydrin-bisphenol of acetone type. The solid epoxide resin was dissolved in phenyl glycidyl ether, at a 4:1 resin:ether ratio. The epoxide polymer had a melting point of about 42° C. and an epoxide equivalent weight of 500. The resulting composition had properties similar to those obtained in Example I.

Amines in the form of their acid salts may also be used in the present invention. Examples of these are materials obtained from the Chemical Division of Armour & Company under the trade names "Duomeen O" and "Duomeen S." "Duomeen O" consists essentially of a mixture of N-alkyl trimethylene diamines derived from technical grade oleic acid. The alkyl group content is distributed approximately as follows:

| | Percent |
|---|---|
| C–14 | 2 |
| C–16 | 5 |
| C–18 | 93 |

"Duomeen S" consists essentially of a mixture of N-alkyl trimethylene diamines derived from soya acids. The alkyl group content is distributed approximately as follows:

| | Percent |
|---|---|
| C–16 | 13 |
| C–18 | 87 |

*Example VII*

10 weight parts of sebacic acid were dissolved in 385 parts of ethyl alcohol and to this were added 17.8 weight parts of "Duomeen S," a product of the Armour Company. The "Duomeen S" consisted of a mixture of N-alkyl trimethylene diamines derived from technical grade soya acids. The alkyl group content was distributed as follows: C–14, 2%; C–16, 5%; C–18, 93%. This solution was then heated to evaporate the alcohol and then heated at 155° C. for 2 hours. The soft resinous product obtained was dissolved in an equal weight of liquid epoxide polymer of the type described in Example I, and the resulting composition exhibited the same water-cleanability and good-hardening characteristics as the adhesive composition produced in Example I.

Epoxy resins containing the hardeners of the present invention are particularly adapted for use as trowelable grouts or mortars to set ceramic tiles, and to fill the joints between the tiles. When used for this purpose, the epoxy resin compositions form a hard, adherent, chemically resistant joint. These compositions also have the advantage that they cure at room temperature, thereby rendering their use for this purpose especially advantageous.

The epoxy resin compositions using the hardeners of the present invention bond exceedingly well to ceramic tile edges and to the backs of ceramic tile. Additionally, these compositions are flexible, and resistant to moderate temperature change. Also, such compositions are resistant to acid and alkali attack.

These epoxy resin compositions also have the advantage of being readily water-cleanable from the surfaces of the ceramic tile, thereby greatly facilitating the tile setting operation.

If desired, the epoxy resins can be compounded with other resins, such as polystyrene resins, polyester resins, and so forth, to increase the flexibility of the hardened composition.

Pigments and fillers of various types may also be incorporated into the adhesive compositions. As examples of such fillers may be mentioned blanc fixe, sand, talc, pyrophyllite, various clays, diatomaceous earth, and other like materials. The fillers are preferably in a fine state of subdivision, and have high surface areas.

Coloring materials may be added to the adhesive composition if desired. The coloring materials include organic and inorganic coloring materials. As examples may be mentioned titanium dioxide, carbon black, cadmium red, Blue Lake (13% Ponsal Blue, 10% aluminum hydrate and 77 percent blanc fixe)-Krebs BP–179–D, Blue Lake Krebs BP–258–D, Lithol Tower, Chrome Yellow, Iron Blue, Milori Blue, Monastral Green, Maron Toner, chrome green, chrome orange, iron oxide reds, aluminum powder, and flatting agents like diatomaceous silica and silica aerogel. The coloring materials should be selected, however, so as to be non-reactive with the epoxy resins and other ingredients at atmospheric temperature, as otherwise this might cause poor storage stability and also affect the retention of adhesiveness.

The adhesive compositions of the present invention may also have incorporated therein, if desired, a lubricant, such as silicone oils, silicone jelly, petroleum jellies, and so forth. As an example of the silicone oil may be mentioned organo-siloxane liquid supplied by General Electric Company as Silicone Liquid No. 81069. Any of the commercially available silicone jellies which are sold under a wide variety of trademarks and trade names may be used.

The following examples are illustrative of bonding compositions using the epoxy resins and the hardeners of the present invention.

Example VIII

A resin base and pigment hardening composition were prepared using the following formulae.

The resin base:
- 28.9 weight parts epoxide resin
- 14.3 weight parts titanium dioxide pigment
- 11.4 weight parts polystyrene resin
- 45.4 weight parts blanc fixe Pigment-hardener composition:
- 28.0 weight parts amido-amino tall oil resin
- 1.7 weight parts diethylene triamine
- 68.5 weight parts blanc fixe
- 1.8 weight parts silica aerogel It will be noted that the hardener portion of this example contains polyamine in free amine form, i.e., diethylene triamine.

The epoxide resin used was of the epichlorohydrin-bisphenol of acetone type described in Example I. The amido-amino tall oil resin was that produced in Example IV by the reaction of dimerized tall oil with excess tetraethylene pentamine at a temperature of 155° C.

The resin base and pigment-hardener composition were mixed, and a smooth, white, easily spreadable composition was produced. The composition was troweled over a wall surface of glazed ceramic tiles. The joints between the tiles were thus filled with this grouting composition. Excess material was removed from the face of the tiles by scraping with the trowel edge and then wiped clean with a water-soaked cotton cloth. A smooth, hard, impermeable grout joint was thus obtained.

Example IX

The following resin-base was prepared:

- 63.5 weight parts of epoxide resin
- 5.5 weight parts of phenyl glycidyl ether
- 1.3 weight parts (2,2'bis(hydroxyphenyl) propane
- 26.7 weight parts of polystyrene resin
- 3.0 weight parts of petroleum jelly and mixed with 3.33 times its weight of the following filler-hardener composition:

- 11.2 weight parts amido-amino tall oil resin, equivalent weight of 135, viscosity at 25° C. of 250 centipoises
- 0.35 weight part diethylene triamine
- 85.6 weight parts sand (through 30 mesh screen)
- 2.8 weight parts silica aerogel
- .05 weight part carbon black It will be noted that the hardener portion of this example contains polyamine in free amine form, i.e., diethylene triamine.

The epoxide resin was of the solid type described in Example VI. It had an epoxide equivalent of about 500, a viscosity of approximately 7,000 centipoises (25° C.), and a melting point of about 42° C.

The poly-amido-amino tall oil resin was produced according to the procedure of Example IV by reacting dimerized tall oil resin with 100% excess tetraethylene pentamine (based upon the stoichiometric amount of a tall oil resin), at a temperature of 155° C.

This gave a trowelable composition that was used to set ceramic quarry tiles, and to subsequently fill the joints between these. Excess material was removed from the tile face by mopping with a sponge wet with water. A hard, adherent, chemically resistant joint was obtained.

Example X

The composition of Example VIII was used to set ceramic tile over a wet concrete floor. A strong bond was obtained despite the wetness of this subsurface.

Example XI

The composition of Example VIII was used to patch the eroded joints of a ceramic tile floor that had been in service for some years in a dairy "cooler room." Although these open joints were soaked with water and detergents draining from sinks in this area, full, hard, and durable joints were obtained.

Example XII

This example was run for comparison with Example VIII.

A resin base and pigment hardening composition are prepared using the formulae of Example VIII, with the exception that in the pigment hardening composition 28.0 weight parts of tetraethylene pentamine are substituted for the 28.0 parts of amido-amino tall oil resin.

The resin base and pigment-hardener composition are mixed, and a smooth, white composition was obtained. The composition is troweled over a wall surface of ceramic tiles. The joints between the tiles are thus filled with the grouting composition.

Excess material is removed from the face of the tiles by scraping with the trowel edge and the faces are then wiped with a water-soaked cotton cloth. Upon continued rubbing, it is found that the remaining composition cannot be removed from the face of the tile.

The composition of Example XII is used to set ceramic tile over a wet concrete floor. The bond obtained after setting is quite weak, and the tiles can easily be displaced and removed from the floor.

The composition of Example XII is also used to patch eroded joints of a ceramic tile floor that has been in service for some years in a dairy "cooler room." Full, hard and durable joints are not obtained, owing to the fact that the joints are soaked with water and detergent draining from sinks in the area.

The invention in its broader aspects is not limited to the specific steps, methods, compositions and improvements shown and described herein, but departures may be made within the scope of the accompanying claims without departing from the principles of the invention and without sacrificing its chief advantages.

What is claimed:

1. A process for installing tile on water wetted surfaces and in the presence of aqueous solutions which comprises preparing an adhesive bonding composition by admixing an epoxy resin having at least two

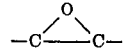

groups with a polyamido-amine epoxide hardener, the polyamido-amine epoxide hardener being the reaction product of a polycarboxylic acid with a stoichiometric excess of a polyamine at elevated temperature, the polycarboxylic acid corresponding tot he formula

R(COOH)$_n$ where R is a hydrocarbon radical and $n$ is an integer of at least 2, and the polyamine having at least two amino nitrogens; coating the water wetted surface with a thin layer of the adhesive bonding composition, spacedly setting the tile on the wetted surface coated with said adhesive bonding composition, filling the spaces between the tile with said composition by spreading the adhesive bonding composition over the face of the tile and into the spaces between the tiles, and removing excess material from the tile surfaces by cleansing with water.

2. In a process for installing tile which comprises spacedly setting tile on a substratum, the improvement which comprises adhesively bonding a plurality of tiles to a substratum with open joints between the tile pieces, grouting the joints between the tile with an adhesive bonding composition produced by admixing an epoxy resin having at least two

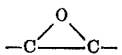

groups and a polyamido-amine epoxide hardener, said hardener being the reaction product of a polycarboxylic acid and a stoichiometric excess of a polyamine the polycarboxylic acid corresponding to the formula $$R(COOH)_n$$

where R is a hydrocarbon radical and $n$ is an integer of at least 2, and the polyamine having at least two amino nitrogens; and removing excess material from the tile surfaces by cleansing with water.

3. The method of claim 2 wherein the adhesive bonding composition comprises an inert finely divided aggregate.

4. The method of claim 2 wherein the epoxy resin comprises an inert aggregate.

5. The method of claim 2 wherein the polyamido-amine epoxide hardener comprises an inert aggregate.

6. The method of claim 3 wherein the epoxy resin portion comprises a polystyrene resin and an inert aggregate.

7. The method of claim 5 wherein the polyamido-amine epoxide hardener portion comprises a polyamine in free amine form.

8. The method of claim 2 wherein the adhesive bonding composition is prepared by admixing an epoxy resin base comprising epoxide resin, phenyl glycidyl ether, 2,2' bis(hydroxyphenyl)propane, polystyrene resin, and petroleum jelly, with an epoxide hardener composition comprising the polyamido-amine epoxide hardener, a polyamine in free amine form, and an inert aggregate.

9. The method of claim 2 wherein the epoxy resin adhesive composition is prepared by admixing an epoxy resin base comprising epoxide resin, polystyrene resin and a finely divided inert aggregate with a pigment hardener composition comprising the polyamido-amine epoxide hardener, a polyamine in free amine form, and an inert aggregate.

10. The method of claim 2 wherein the epoxide resin adhesive composition is prepared by mixing one part of the following resin base:

63.5 weight parts of epoxide resin
5.5 weight parts of phenyl glycidyl ether
1.3 weight parts 2,2' bis(hydroxyphenyl) propane
26.7 weight parts of polystyrene resin
3.0 weight parts of petroleum jelly with about 3.33 parts of the following filler-hardener composition:

11.2 weight parts of amido-amino tall oil resin
0.35 weight part diethylene triamine
85.6 weight parts sand (through 30 mesh screen)
2.8 weight parts silica aerogel
.05 weight part carbon black 11. The method of claim 2 wherein the adhesive composition is prepared by admixing the following resin base:

28.9 weight parts epoxide resin
14.3 weight parts titanium dioxide pigment
11.4 weight parts polystyrene resin
45.4 weight parts blanc fixe with the following pigment-hardener composition:

28.0 weight parts amido-amino tall oil resin
1.7 weight parts diethylene triamine
68.5 weight parts blanc fixe
1.8 weight parts silica aerogel 12. A process for pointing tile which comprises providing a tile assembly comprising a plurality of tile with open joints between the tile pieces, filling the joints by spreading over the surface of the tile assembly an adhesive bonding composition produced by admixing an epoxy resin having at least two

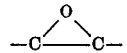

groups and a polyamido-amine epoxide resin hardener, said hardener being the reaction product of a polycarboxylic acid and a stoichiometric excess of a polyamine, the polycarboxylic acid corresponding to the formula $R(COOH)_n$, where R is a hydrocarbon radical and $n$ is an integer of at least 2, and the polyamine having at least two amino nitrogens and removing excess adhesive composition from the surface of the tile assembly by cleansing with water.

13. The method of claim 12 wherein the epoxy resin is the reaction product of a dihydric phenol and epichlorohydrin.

14. The method of claim 1 wherein the epoxy resin is the reaction product of a dihydric phenol and epichlorohydrin.

15. The method of claim 2 wherein the epoxy resin is the reaction product of a dihydric phenol and epichlorohydrin.

16. The improvement of claim 2 wherein the plurality of tiles are bonded to the substratum with an adhesive produced by admixing an epoxy resin having at least two

groups and a polyamido-amine epoxide resin hardener, said hardener being the reaction product of a polycarboxylic acid and a stoichiometric excess of a polyamine, the polycarboxylic acid corresponding to the formula $R(COOH)_n$, wherein R is a hydrocarbon radical and $n$ is an integer of at least 2, and the polyamine having at least two amino nitrogens.

References Cited in the file of this patent

UNITED STATES PATENTS

| | | |
|---|---|---|
| 2,049,429 | Denk | Aug. 4, 1936 |
| 2,335,555 | Willson | Nov. 30, 1943 |
| 2,353,228 | Ducca | July 11, 1944 |
| 2,705,223 | Renfrew | Mar. 29, 1955 |
| 2,718,829 | Seymour | Sept. 27, 1955 |
| 2,760,944 | Greenlee | Aug. 28, 1956 |
| 2,899,397 | Aelony | Aug. 11, 1959 |
| 2,916,476 | Caldwell et al. | Dec. 8, 1959 |
| 2,937,162 | Martin et al. | May 17, 1960 |
| 2,939,710 | Dossmann et al. | June 7, 1960 |
| 2,957,844 | Wesp | Oct. 25, 1960 |
| 2,962,468 | Groves | Nov. 29, 1960 |
| 2,990,383 | Glazer | June 27, 1961 |
| 3,008,914 | Fry | Nov. 14, 1961 |
| 3,026,575 | Luscher | Mar. 27, 1962 |
| 3,050,493 | Wagner et al. | Aug. 21, 1962 |

OTHER REFERENCES

Popular Mechanics, October 1956, pages 167 and 168.
German Application 1,055,218, 1959.